US010779383B2

(12) United States Patent
Lydecker et al.

(10) Patent No.: US 10,779,383 B2
(45) Date of Patent: *Sep. 15, 2020

(54) COMMAND EXECUTION SYNCHRONIZATION IN A FLOOD NETWORK

(71) Applicant: ABL IP HOLDING LLC, Conyers, GA (US)

(72) Inventors: Stephen H. Lydecker, Snellville, GA (US); Sajin George, Somerville, MA (US); Yenpao Lu, Cumming, GA (US); Mitri J. Abou-Rizk, Newton, MA (US)

(73) Assignee: ABL IP HOLDING LLC, Conyers, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/678,124

(22) Filed: Nov. 8, 2019

(65) Prior Publication Data

US 2020/0187322 A1      Jun. 11, 2020

Related U.S. Application Data

(63) Continuation of application No. 16/216,440, filed on Dec. 11, 2018, now Pat. No. 10,485,080.

(51) Int. Cl.
*H05B 47/19* (2020.01)
*H05B 45/305* (2020.01)
(Continued)

(52) U.S. Cl.
CPC ............ *H05B 47/19* (2020.01); *H04L 5/0039* (2013.01); *H04L 67/1089* (2013.01); *H04W 84/20* (2013.01); *H04W 72/0453* (2013.01)

(58) Field of Classification Search
CPC ... H05B 47/19; H04L 5/0039; H04L 67/1089; H04W 84/20; H04W 72/0453
See application file for complete search history.

(56) References Cited

U.S. PATENT DOCUMENTS 9,600,983 B1     3/2017  Lydecker et al.
10,485,080 B1 *  11/2019  Lydecker ............. H04L 67/325
(Continued)

OTHER PUBLICATIONS

Entire prosecution history of U.S. Appl. No. 16/216,440, titled "Command Execution Synchronization in a Flood Network," filed Dec. 11, 2018.

(Continued)

*Primary Examiner* — Henry Luong
(74) *Attorney, Agent, or Firm* — RatnerPrestia

(57) ABSTRACT

An example method includes propagating a message including an instruction, from a gateway to a plurality of ancillary nodal devices (devices) in a flood network. Each of the plurality of devices is within an equal number of transmissive steps of the gateway through the flood network such that the message is propagated with approximately equivalent delay to each of the plurality of devices and substantially simultaneously received by all of the devices. The method also includes substantially simultaneously transmitting the message from each respective one of the devices to end nodal devices (end nodes) of a group of end nodes in the flood network in communication with the respective one of the devices. The method further includes, upon receipt of the message from the devices, substantially simultaneously executing the instruction, by each of the group of the end nodes of the flood network.

20 Claims, 11 Drawing Sheets

(51) Int. Cl.
*H04L 5/00* (2006.01)
*H04L 29/08* (2006.01)
*H04W 84/20* (2009.01)
*H04W 72/04* (2009.01)

(56) References Cited

U.S. PATENT DOCUMENTS

| | | | |
|---|---|---|---|
| 2013/0063042 A1* | 3/2013 | Bora | H05B 47/19 |
| | | | 315/292 |
| 2014/0029701 A1 | 1/2014 | Newham et al. | |
| 2015/0147067 A1 | 5/2015 | Ryan et al. | |
| 2017/0234727 A1 | 8/2017 | O'Toole et al. | |
| 2017/0364348 A1 | 12/2017 | Klitenik et al. | |
| 2018/0115435 A1 | 4/2018 | George et al. | |
| 2018/0288390 A1 | 10/2018 | Luo | |

OTHER PUBLICATIONS

Non Final Office Action for U.S. Appl. No. 16/126,540, dated Dec. 30, 2019, 21 pages.
Notice of Allowance for U.S. Appl. No. 16/126,540, dated Mar. 19, 2020, 13 pages.

* cited by examiner

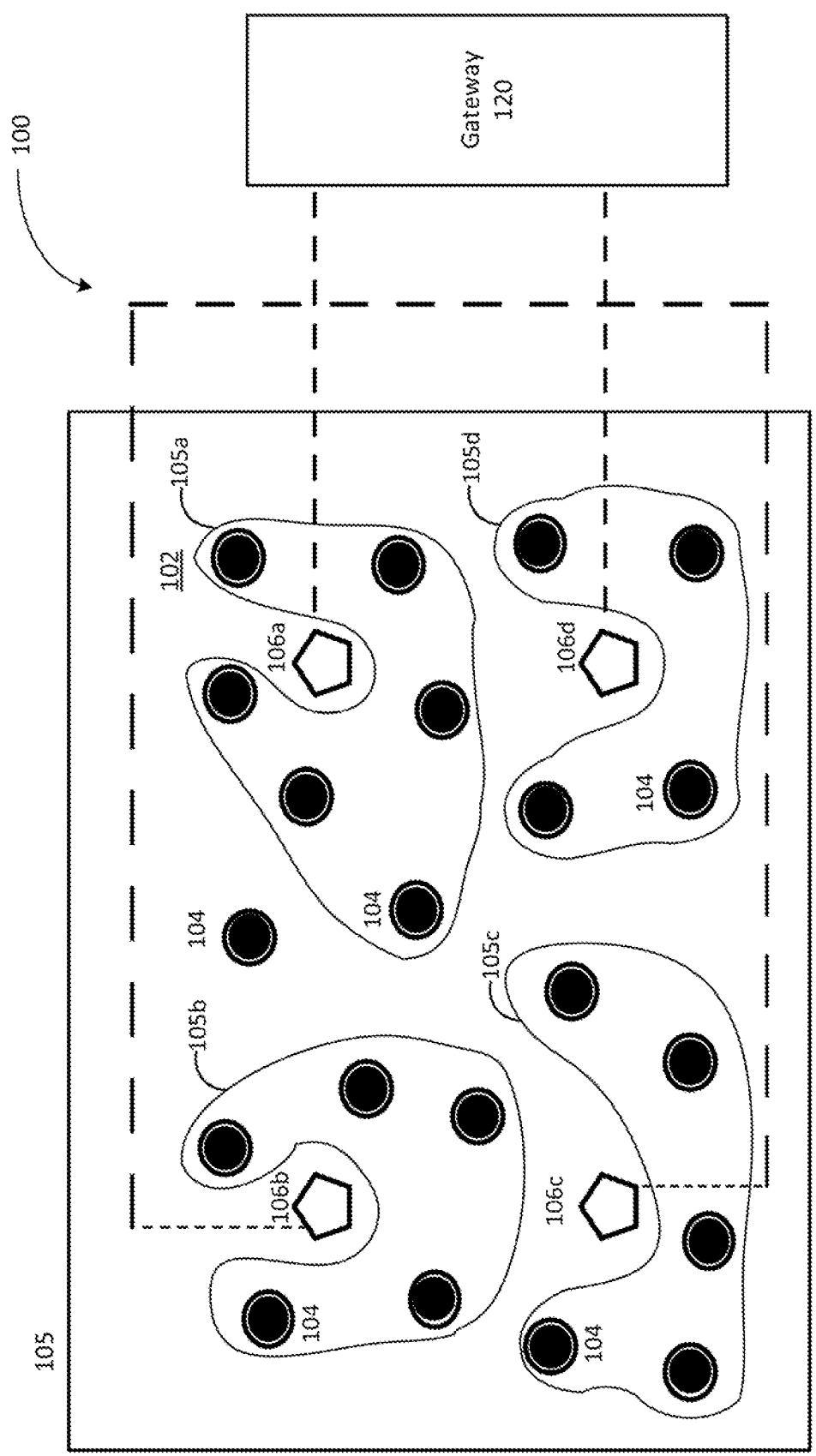

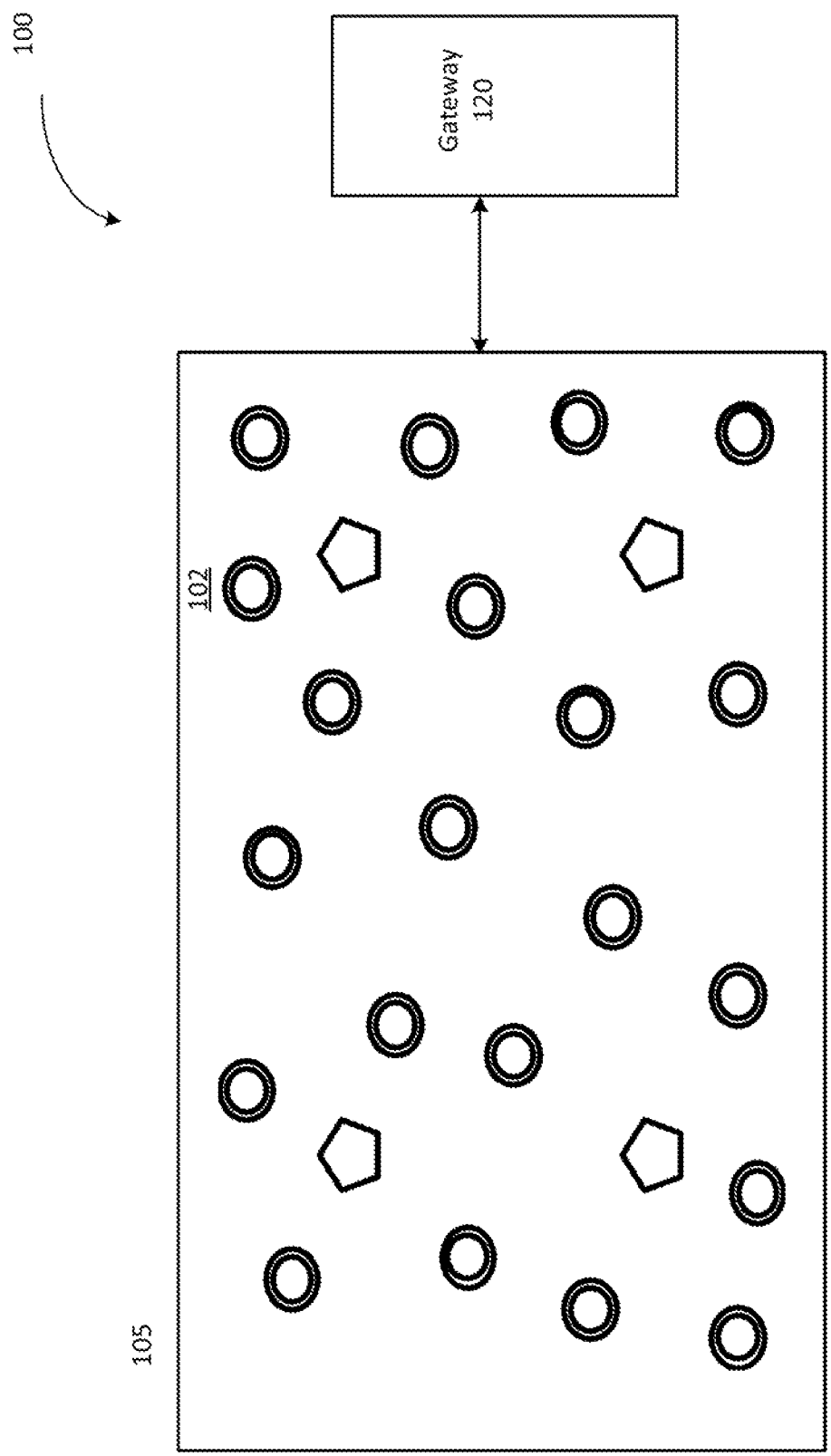

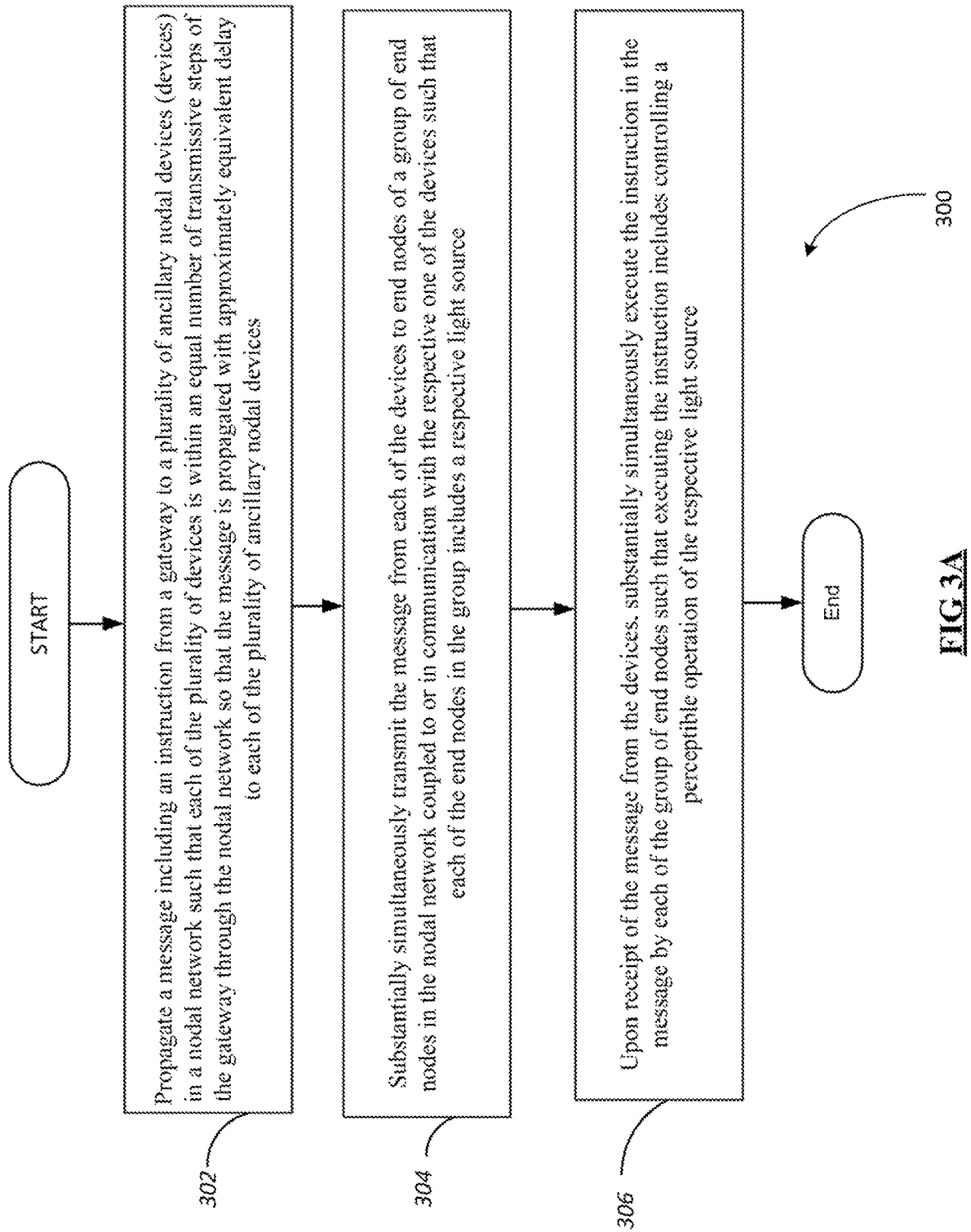

US 10,779,383 B2

COMMAND EXECUTION SYNCHRONIZATION IN A FLOOD NETWORK

CROSS-REFERENCE TO RELATED APPLICATIONS

This application is a divisional of U.S. patent application Ser. No. 16/216,440, filed Dec. 11, 2018, now U.S. Pat. No. 10,485,080, issued Nov. 19, 2019, titled "COMMAND EXECUTION SYNCHRONIZATION IN A FLOOD NETWORK," the entire disclosure of which is incorporated herein by reference.

TECHNICAL FIELD

The examples discussed below relate to methods, systems and apparatuses to provide substantially simultaneous command execution in end nodes of a wireless flood network, using ancillary nodal devices as edge gateways.

BACKGROUND

Localized wireless networking for sensing and/or control purposes is becoming increasingly common. Fairly large area installations may use a mesh or other nodal wireless network topology for communications. In a wireless network having radio-frequency (RF) nodes, each node typically includes a receiver and transmitter, sometimes referred to collectively as a transceiver, offering capabilities for receiving and sending digital information over radio signals. The device at each node of the network may include a sensor and/or a controlled element, such as a light source. Where operation of the controllable elements is perceptible by a person in a location or premises served by the system, it may be desirable for some or all of the nodes to execute a common control operation (e.g. turn all lights On or turn all lights Off) sufficiently close in time that the perceptible operations of the devices at the nodes appear to be simultaneous to any person who may observe the nodes as they execute the control operation in common.

In one example of RF-networked luminaires, approximately 400 luminaires in a big-box store interior are to be turned on, that is, a Lights On command is to be received and executed by all the luminaires. If the command is propagated node-to-node by normal network procedures, hopping opportunistically through the network (e.g. through a routing mesh network), and if the command is furthermore executed by each luminaire upon receipt at each different node, then the lights will tend to turn on in a perceptibly non-synchronous manner: an erratic wave of turn-ons will propagate across the ceiling. This distracting outcome is termed the "popcorn effect" by analogy to the unpredictable, asynchronous popping of kernels in a popper. The popcorn effect can create unwelcome visual effects for any kind of perceptible light adjustment (on, off, dimming, color change). In some applications (e.g., stage lighting, studio lighting, TV and movie lighting), perceptible pop-corning may be completely unacceptable. Older lighting systems avoided pop-corning by direct hard-wiring of all luminaires to a power source. Flipping a switch sends the "command" (power) to all luminaires simultaneously. However, such technique does not assure substantially simultaneous command execution for network-disseminated digital commands in a wireless luminaire system e.g. that uses a wireless nodal network for command communication. Thus, there is a need for a method of assuring command execution by devices in a nodal network that will be at least sufficiently close in time to appear simultaneous to a person observing execution of the command at a number of nodes of the system.

SUMMARY

Hence, there is a need for a system and method for assuring command execution by nodal devices (nodes) in a flood network that is adequately simultaneous. For example, where the nodes are synchronized with ancillary devices of the network to execute a command or instruction by changing an operational condition in a manner that may be quickly perceived by a person, execution by the nodes may be sufficiently simultaneous so that any timing differences between execution at various nodes is small enough that the execution appears to be simultaneous when observed by the person.

A method, for example, includes propagating a message including an instruction, from a gateway to a plurality of ancillary nodal devices in a flood network. Each of the plurality of ancillary nodal devices is within an equal number of transmissive steps of the gateway through the flood network such that the message is propagated with approximately equivalent delay to each of the plurality of ancillary nodal devices and substantially simultaneously received by all of the ancillary nodal devices. The method also includes substantially simultaneously transmitting the message from the ancillary nodal device such that the transmitting includes transmitting the message from each respective one of the ancillary nodal devices to end nodal devices of a group of end nodal devices in the flood network coupled to or in communication with the respective one of the ancillary nodal devices. Each of the end nodal devices of each group includes a respective light source. The method further includes upon receipt of the message from the ancillary nodal devices, substantially simultaneously executing the instruction, by each of the group of the end nodal devices of the flood network. The executing the instruction includes controlling a perceptible operation of the respective light source.

A system, for example, includes a plurality of end nodal devices distributed in a flood network. Each of the plurality of end nodal devices includes a light source; and a node radio frequency transceiver configured to receive and transmit radio frequency signals in a first frequency band. The system also includes a number of ancillary nodal devices distributed in the flood network. Each ancillary nodal device includes a plurality of end nodal devices distributed in a flood network. Each of the plurality of end nodal devices includes a light source and a node radio frequency transceiver configured to receive and transmit radio frequency signals in a first frequency band. A number of ancillary nodal devices distributed in the flood network. Each ancillary nodal device includes an ancillary node radio frequency transceiver, the ancillary node radio frequency transceiver being configured to communicate with the node radio frequency transceivers of at least some of the end nodal devices. The system also includes a communication interface; and a gateway communicatively coupled to the communication interfaces of the ancillary nodal devices. The gateway is configured to substantially simultaneously transmit a message including an instruction to the ancillary nodal devices. Each of the plurality of ancillary nodal devices is within an equal number of transmissive steps of the gateway through the flood network such that the message is transmitted with approximately equivalent delay to each of the plurality of ancillary nodal devices and is substantially simultaneously received by all of the ancillary nodal devices. Each of the ancillary nodal devices is configured to substantially simultaneously transmit the message to the end nodal devices of a group of the end nodal devices in the flood network. Upon receipt of the message from the ancillary nodal devices, each of the groups of the end nodal devices is configured to substantially simultaneously execute the instruction; and to execute the instruction, each end nodal device of each group is configured to control a perceptible of the respective light source.

Additional objects, advantages and novel features of the examples will be set forth in part in the description, which follows and in part will become apparent to those skilled in the art upon examination of the following and the accompanying drawings or may be learned by production or operation of the examples. The objects and advantages of the present subject matter may be realized and attained by means of the methodologies, instrumentalities and combinations particularly pointed out in the appended claims.

BRIEF DESCRIPTION OF THE DRAWINGS

The drawing figures depict one or more implementations in accordance with the present concepts, by way of example only, not by way of limitations. In the figures, like reference numerals refer to the same or similar elements.

FIGS. 1A-1C illustrate one example of a substantially simultaneous command execution synchronization implemented by the system of FIG. 1.

FIG. 3A is a flowchart of one example of a process for providing substantially simultaneous command execution synchronization in the flood network using the edge gateways.

DETAILED DESCRIPTION

Figure 1:
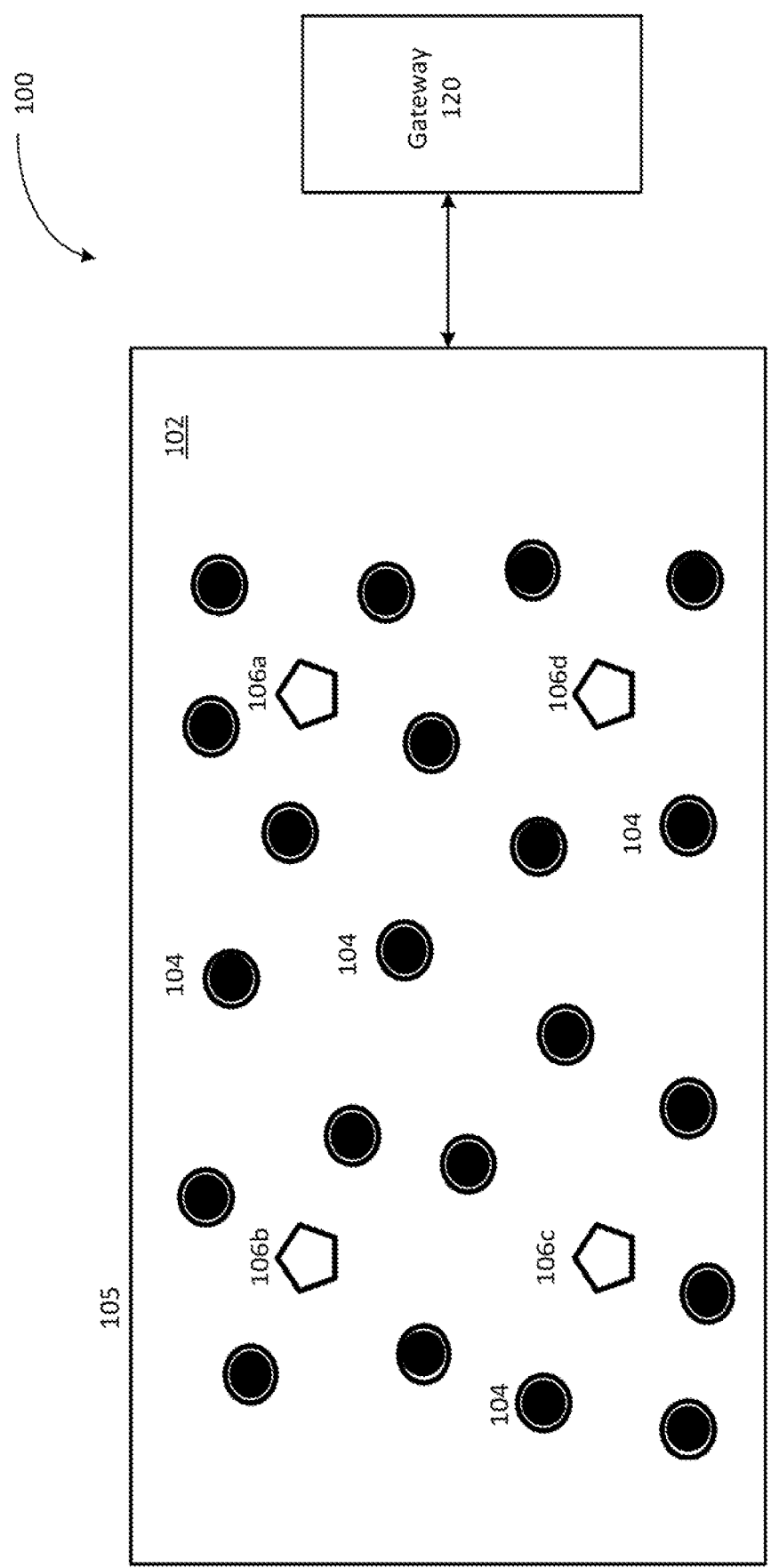
FIG. 1 is a high-level block diagram of an example of a system for implementing a substantially simultaneous command execution synchronization in a flood network having ancillary nodes, such as edge gateways.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

The examples described below relate to substantially simultaneous command communication and execution techniques in the context of a network of wireless radio-frequency (RF) nodes, e.g., a network of RF nodes of which some number of the RF nodes are integrated with luminaires. The end nodes have the capability to execute certain commands, such as light ON/OFF instructions in the luminaire example, via RF signals radiated by one or more other nodes in the network. The examples discussed in detail below encompass several methods using distribution through ancillary nodes for assuring perceptibly simultaneous command execution by two or more nodes in the flood network.

The term "node" refers to a device, e.g. based on the RF, which includes, for example, "intelligence" or otherwise is an intelligent node. Such "intelligence" is provided, for example, via a central processing unit (CPU), microcontroller, driver, including some sensing and/or control capability or other capabilities provided via a processor within or otherwise collocated with the node. Many nodes may be included in or coupled to control lighting devices.

The nodes may be included in or coupled to a variety of different types of controllable devices. In the detailed examples, each node includes a light source (e.g. in a luminaire integrated with or connected to the node). As used herein, terms such as lighting device or luminaire are intended to encompass essentially any type of device with a controllable source that processes power to generate light, for example, for illumination of a space intended for use of or occupancy or observation, typically by one or more people or other types of living organism that can take advantage of or be affected in some desired manner by the light emitted from the device. A device at or coupled to a node, for example, may take the form of a lighting device such as a lamp, light fixture or other luminaire that incorporates a source, where the source by itself contains no intelligence or communication capability (e.g. LEDs or the like, or lamp ("regular light bulbs") of any suitable type) and an associated modulator and logic circuitry. Alternatively, a fixture or luminaire may be relatively dumb but include a source device (e.g. a "light bulb") that incorporates the logic, communication and modulation capabilities discussed herein. In most examples, the lighting device(s) in the nodes illuminate a service area to a level useful for a human in or passing through the space, e.g. regular illumination of a room or corridor in a building or of an outdoor space such as a street, sidewalk, parking lot or performance venue. However, it is also possible that one or more nodes in or on a particular premises served by a system of lighting devices have other lighting purposes, such as signage for an entrance or to indicate an exit. Of course, the lighting devices may be configured for still other purposes, e.g. to benefit human or non-human organisms or to repel or even impair certain organisms or individuals. The actual source in each lighting device may be any type of artificial light emitting unit.

The term "coupled" as used herein refers to any logical, physical or electrical connection, link or the like by which signals produced by one system element are imparted to another "coupled" element. Unless described otherwise, coupled elements or devices are not necessarily directly connected to one another and may be separated by intermediate components, elements or communication media that may modify, manipulate or carry the signals.

In an example, a technique for distribution of a command from a source gateway to a number of ancillary nodal devices (e.g. edge gateways at ancillary nodes) provides substantially simultaneous retransmission to command execution by two or more end nodal devices in a flood network. In the examples, the edge gateway type ancillary nodal devices in the network function are at least substantially synchronized with each other such that a command is substantially simultaneously issued from the ancillary nodal devices to groups of the end nodal devices, causing execution to be approximately simultaneous across the end nodal devices. In one such example, the edge gateways are at distances from the command-source that enable reception of a command sent to all of the edge gateways at about the same time, to facilitate substantially synchronous retransmission to respective groups of end nodal devices.

Generally speaking, network flooding is a communication technique in which a router or the like forwards a message over all of its outgoing routes or ports but not over the route or port through which the router received the message. In some examples discussed more fully below, the source gateway floods the message to the edge gateways (e.g. via a wireless broadcast) over a first band or protocol (e.g. WiFi). Then, each edge gateway reformats the message and floods the message to the end nodal devices within range via wireless broadcasting over a second band or protocol (e.g. BLE) for substantially simultaneous execution of the command contained in the message.

The edge gateway typically is positioned in a location in such a way that the message can reach all the end nodal devices (propagates to those devices) with a single hop from the edge gateways. In another example (e.g. in a network that may require multiple hops in one or more of the flooding stages), an action timestamp, e.g. related to a fixed delay provided between time of issuance of a command and the time of execution of the command by the end nodal devices, may be added to the message. If multiple hops are required from the source gateway to some of the edge gateways, the timestamp causes at least retransmission by the edge gateway to the ancillary end nodal devices to be approximately simultaneous across the edge gateways, and subsequent execution at the end nodal devices to be approximately simultaneous. Alternatively, final execution at ancillary end nodal devices may be synchronized based on the timestamp, for example, if multiple hops are needed between an edge gateway and some end nodal devices.

Details of the examples are provided herein below.

FIG. 1 illustrates, in a block diagram form, an example of a system 100 for providing a command execution synchronization using edge gateways or the like in a flood network. The system 100 includes a flood network 102 having a plurality of end nodal devices 104 (or end nodes) and a plurality of ancillary nodal devices 106 distributed about a space 105. Ancillary nodal devices 104 and end nodes 106 are all nodes of a flood network discussed in more detail later. Although the ancillary nodal devices 106 may be implemented by other configurations, the example ancillary nodal devices 106 are edge gateways; and some later discussions of such devices 106 utilize the edge gateway example terminology for ease of reference. As an example, four ancillary nodal devices 106a-106d are illustrated in the system 100, but it would be obvious to one of ordinary skill for the system 100 to include more or less than four ancillary nodal devices. Each of the example end node 104 includes at least a light source such as a light fixture 408 (FIG. 4) and a node radio frequency transceiver 413 or 415 (FIG. 4) details of which are provided below. Each of the example edge gateway type ancillary nodal devices 106a-106d includes an ancillary node radio frequency transceiver 413 or 415 (FIG. 4) that is configured to communicate with the end node radio frequency transceivers 411 of at least some of the end nodes 104. In one implementation, the plurality of radio frequency transceivers 413, 415 (FIG. 4) in the corresponding end nodes 104 form groups on the flood network formed with the ancillary nodal devices. In one example, each ancillary nodal device 106 has greater communicative range than a typical node. The physical locations and communicative ranges of ancillary nodal devices 106 are such that every end node 104 of the network 102 is in direct communication with at least one of the ancillary nodal devices 106, and each of the ancillary nodal devices is in communication (direct or via a similar number of hops) with a source of command messages.

The system 100 also includes a fog gateway (gateway) 120, which is configured to communicate with each of the ancillary nodal devices 106a-106d of the flood network. Although referred to as a gateway, the fog gateway 120 is an example of a system element that introduces a command for propagation through the flood network formed by the nodes 104. In one example, the fog gateway 120 is a computerized interface between the network 102 and another network (not shown in FIG. 1), such as an internet which is coupled to a computer/server (not shown in FIG. 1). In one example, end nodes 104 communicate at least the respective nearest ancillary nodal device 106 and possibly with each other via Bluetooth or a similar low-power, short-range modality. In one example, the fog gateway 120 communicates with the ancillary nodal devices 106a-106d via WiFi or another longer-range modality. Thus, in one example, the ancillary nodal devices 106a-106d are capable of communicating in at least two distinct modalities and function as gateways between the two wireless modalities. In one implementation, the ancillary nodal devices 106 are positioned to be in contact by an equal number of transmissive steps of equal delay (e.g., repeaters or node hops), with the fog gateway 120 that can originate messages and/or commands to propagate through the flood network 102, through the ancillary nodal devices 106 and thereby to the end nodes 104.

In one implementation, a message is propagated into the network 102, e.g. by transmission from the fog gateway 120. The message is propagated to be transmitted to at least one of the ancillary nodal devices 106. In one example, the message is transmitted to the ancillary nodal devices 106a-106d. In one implementation, each of the ancillary nodal devices 106 are positioned within an equal number of transmission steps of the gateway through the network 102 such that the message is transmitted with approximately equivalent delay (e.g. repeaters or node hops) to each of the ancillary nodal devices 106. In one example, the message is transmitted from the fog gateway 120 to the devices by a single, direct transmission step. In one implementation, the message is substantially simultaneously received by each of the ancillary nodal devices 106. Each of the ancillary nodal devices 106a-106d transmit the message approximately simultaneously to a group of the end nodes 104. Specifically, each of the devices 106a-106d are assigned to a specific group of end nodes 104 that are within a range (e.g. short range) of transmission to the respective ancillary nodal device 106. In one example, each of the ancillary nodal devices 106a-106d are in direct communication to their respective group of end nodes 104. Accordingly, each of the ancillary nodal devices 106a-106d transmit the message approximately simultaneously to their respective group of the end nodes 104.

In one implementation, the message includes an instruction. Accordingly, upon receipt of the message, each of the group of end nodes 104 substantially simultaneously execute the instruction in the message. If the ancillary nodal devices 106 support the same control function, e.g. operation of included light sources, the ancillary nodal devices 106 execute the instruction at about the same time that they retransmit the instruction to the groups of end nodes 104. In such an example, the ancillary nodal devices 106 and the end nodes 104 all substantially simultaneously execute the instruction in the message.

Figure 1B:
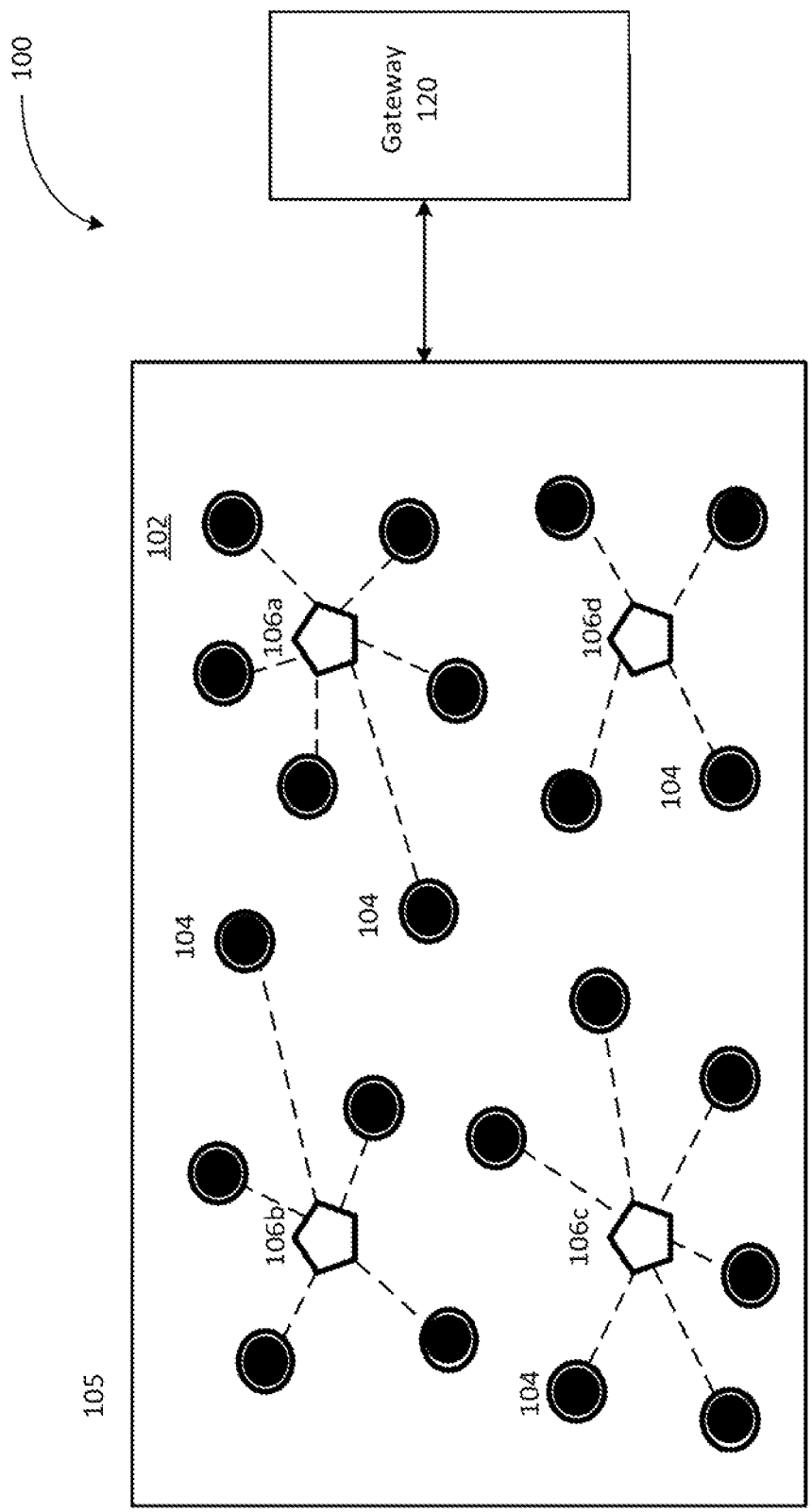

Referring to FIGS. 1A-1B there is shown a graphical representation of an example of a substantially simultaneous command execution synchronization providing the message including the instruction as described above. As illustrated, there is shown an example of the four ancillary nodal devices 106a-106d and a plurality of end nodes 104. As discussed above, each of the four ancillary nodal devices 106a-106d are assigned to a specific group of end nodes. For example, the ancillary nodal device 106a is assigned to a first group 105a consisting of six nodes, device 106b is assigned to a second group 105b consisting of five nodes, device 106c is assigned to a third group 105c consisting of seven nodes and device 106d is assigned to fourth group 105d consisting of four nodes. In one example, the black filled end nodes 104 illustrate lights OFF and unfilled end nodes 104 illustrate lights ON.

In one implementation, the fog gateway 120 transmits a message 180 to the four devices 106a-106d. In one example, the message 150 includes an instruction to turn ON the light source in the end node 104. The dashed lines in FIG. 1A represent a path from the fog gateway 120 to each of the four devices 106a-106d. In one implementation, each of the devices 106a-106d approximately simultaneously transmit the message to their respective assigned group of end nodes 104a-104d as illustrated in FIG. 1B. The dashed lines in FIG. 1B represent a path from the devices 106a-106d to the end nodes 104 in their respective groups' 105a-105d. In one implementation, each of the end nodes 104 in their respective groups' 105a-105d receive the message and substantially execute the instruction. As mentioned above, the instruction is to turn ON the light source in the end node 104. In one example, the unfilled end nodes 104 represent lights ON as illustrated in FIG. 1C.

In one implementation, a field for value that relates to time delay such as action timestamp value may be added to the message by the fog gateway 120 or the ancillary nodal devices 106a-106d. The timestamp is an optional; and for example, may not be necessary if all the end nodes 104 can receive the message via a single hop from a respective one of the ancillary nodal devices 106a-106d. If provided, however, the action timestamp value specifies a fixed time delay value defined as a time of execution of the message by the end nodes 104 in their respective groups. Accordingly, upon receipt of the message, each of the end nodes 104 in their respective groups' 105a-105d substantially simultaneously execute the instruction in the message at the fixed time delay value specified by the action timestamp value. In one implementation, each of the nodes in their respective groups' 105a-105d substantially simultaneously execute the instruction in the message at the fixed time delay value specified by the action timestamp value regardless of the time when each of the end nodes 104 receive the message. For example, the action timestamp value specifies the fixed time delay value for each end node 104 in their respective groups 105a-105d to substantially simultaneously execute the instruction to turn ON the light source. In one implementation, each of the end nodes 104 in their respective groups' 105a-105d receive the message and substantially turn ON the light source. In one implementation, the action timestamp value is predetermined based on a layout of the network 102 (e.g. approximate number of end nodes 104, approximate distance between the end nodes 104, approximate distance between the gateway 120 and the nodal devices 106 etc.) so that execution of a perceptible operation at a number and possibly all of the nodes 104 within their respective groups will appear as execution at the same time if a person observes such execution across the nodes 104.

The message distribution technique through the system 100 may suffice for substantially simultaneous instruction execution, without further synchronization, particularly if the ancillary nodal devices 106 are positioned to be in contact by an equal number of transmissive steps of equal delay (e.g., repeaters or node hops), with the fog gateway 120 or the like that is the source of the messages. There may be installations where additional synchronization may be helpful, particularly if the ancillary nodal devices 106 are not positioned to be in contact by an equal number of transmissive steps with the message source.

Figure 2:
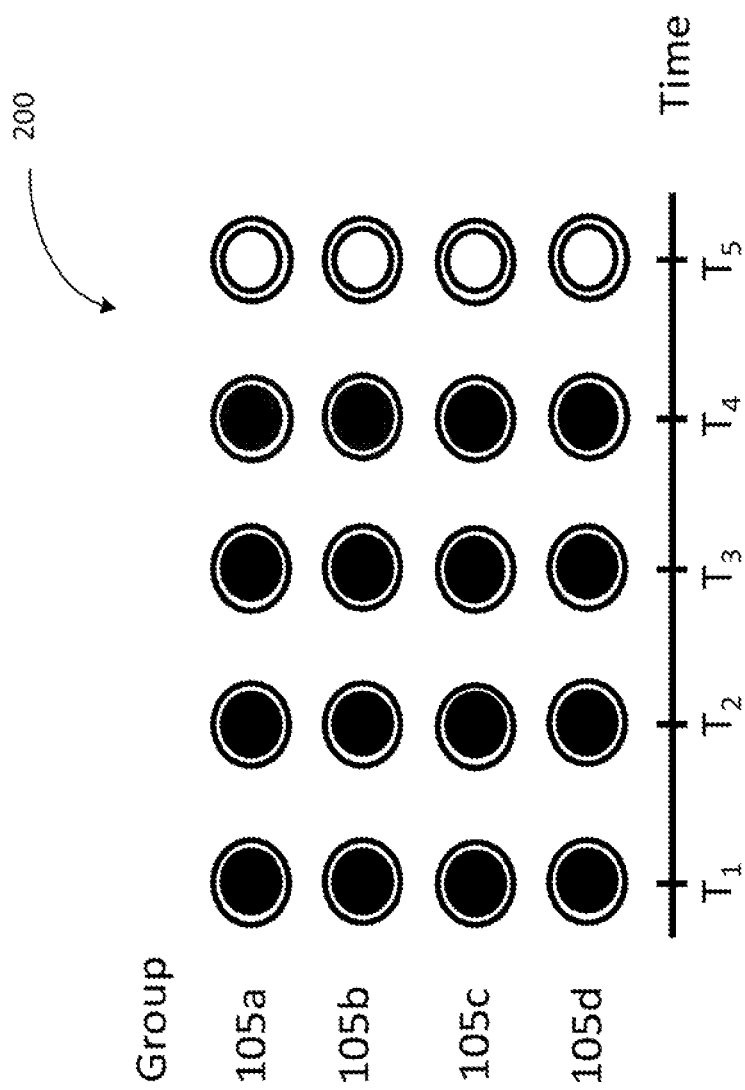
FIG. 2 is a graphical representation of an optional example of substantially simultaneous command execution synchronization among the edge gateways in the system of FIG. 1.

Referring to FIG. 2, there is shown a graphical representation 200 of an example of a command execution synchronization methodology that may be added in a system of end nodes 104 and ancillary nodal devices 106. This additional synchronization technique provides an action timestamp value in the message, at least as initially sent out into the flood network by the fog gateway 120 or other message source. The timestamp, for example, may be used by ancillary nodal devices 106 at different distances from the message source sufficient to result in different propagation delays for receipt of a message among the ancillary nodal devices 106 causing the ancillary nodal devices 106 to synchronize their retransmissions of the end nodes 104.

As illustrated, there is shown an example of the four groups 105a-1-05d of nodes at five different times, the first time, $(T_1)$, a second time, $(T_2)$ subsequent the first time, a third time, $(T_3)$ subsequent the second time, a fourth time, $(T_4)$ subsequent the third time and the fifth time $(T_5)$ subsequent the fourth time. In this example, the $T_5$ is the action time stamp value identified in the message.

In one example, a message is propagated through the flood network to each of the devices 106a-106d. As discussed above, the message includes the instruction and the action timestamp value identifying the fifth time $(T_5)$, which occurs later than the $T_1$, $T_2$, $T_3$ and $T_4$, and an instruction including a turn ON the light source in each of the end nodes 104. In this example, the black filled end nodes 104 illustrate lights OFF and unfilled end nodes 104 illustrates lights ON. As such, at each of the first time, $(T_1)$, the second time, $(T_2)$, the third time, $(T_3)$ and the fourth time, $(T_4)$ lights remain OFF regardless of whether each of the end nodes 104 in their respective groups 105a-105d has received the message yet or not. Accordingly, all the nodes in their respective groups' 105a-105d turn ON the light source at the fifth time $T_5$.

FIG. 3A is a flow chart depicting an example of a method 300 for providing substantially simultaneous command execution using nodal devices as edge gateways in which the message includes the instruction as described above. In one example, the method 300 is implemented by the system 100 of FIG. 1.

Figure 3B:
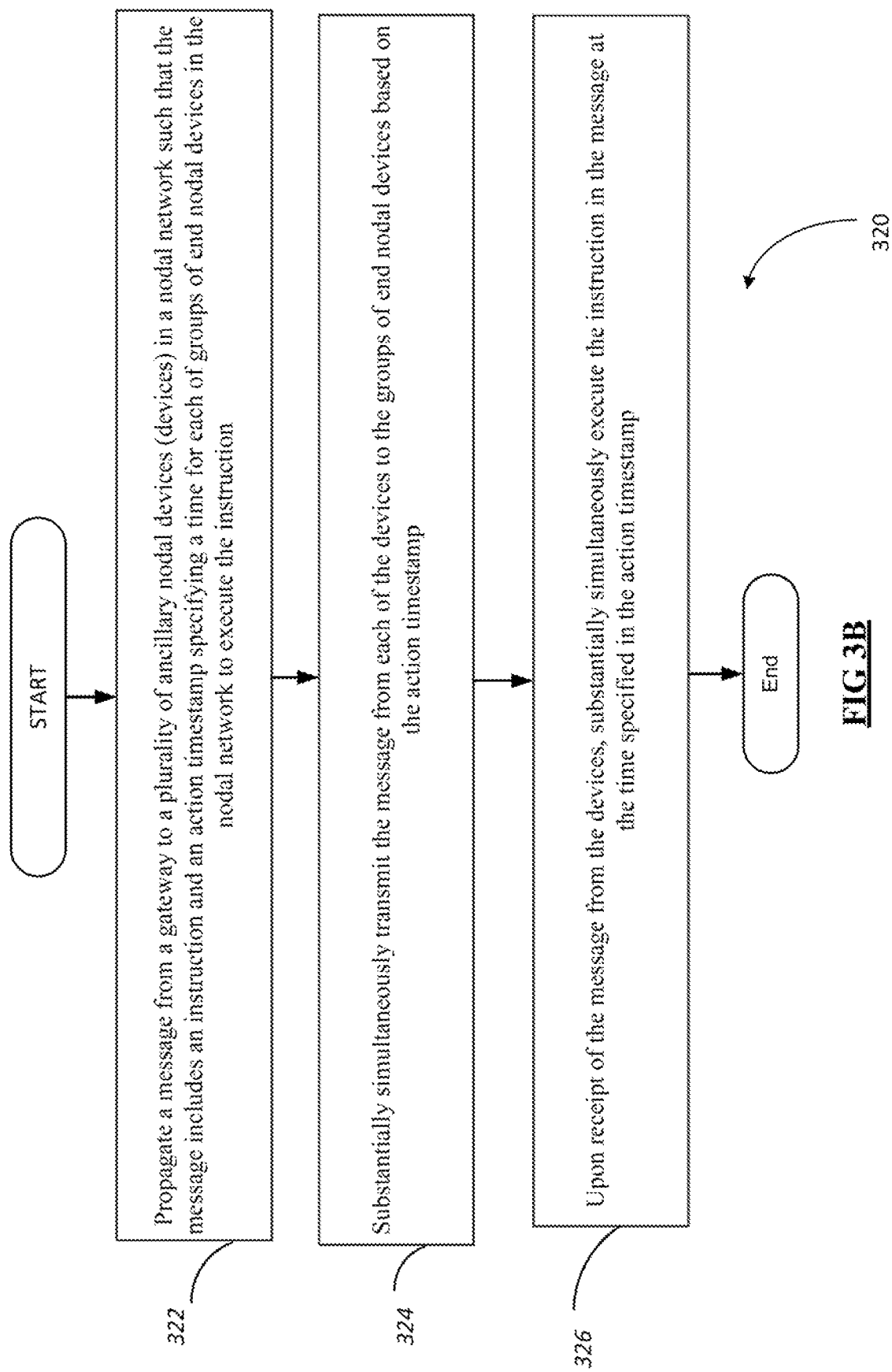
FIG. 3B is a flowchart of another example of a process for providing substantially simultaneous command execution synchronization in the flood network based on a specified time, using the edge gateways.

At block 302, propagate a message including an instruction from a gateway to a plurality of ancillary nodal devices (devices) in a flood network such that each of the plurality of devices is within an equal number of transmissive steps of the gateway through the flood network so that the message is propagated with approximately equivalent delay to each of the plurality of ancillary nodal devices. At block 304, substantially simultaneously transmit the message from each of the devices to end nodes of a group of end nodes in the flood network coupled to or in communication with the respective one of the devices such that each of the end nodes in the group includes a respective light source. At block 306, upon receipt of the message from the devices, substantially simultaneously execute the instruction in the message, by each of the group of end nodes such that executing the instruction includes controlling a perceptible operation of the respective light source FIG. 3B is a flow chart depicting an example of a method 320 for providing substantially simultaneous command execution using ancillary devices as edge gateway in which the message includes the instruction and an action timestamp value. In one example, the method 100 is implemented by the system 100 of FIG. 1.

At block 322, propagate a message from a gateway to a plurality of ancillary nodal devices (devices) in a flood network such that the message includes an instruction and an action timestamp specifying a time for each of the groups of end nodal devices in the flood network to execute the instruction. At block 324, substantially simultaneously transmit the message from each of the ancillary nodal devices to the group of end nodal devices based on the action timestamp. At block 326, upon receipt of the message from the ancillary nodal devices, substantially simultaneously execute the instruction in the message at the time specified in the action timestamp.

Figure 4:
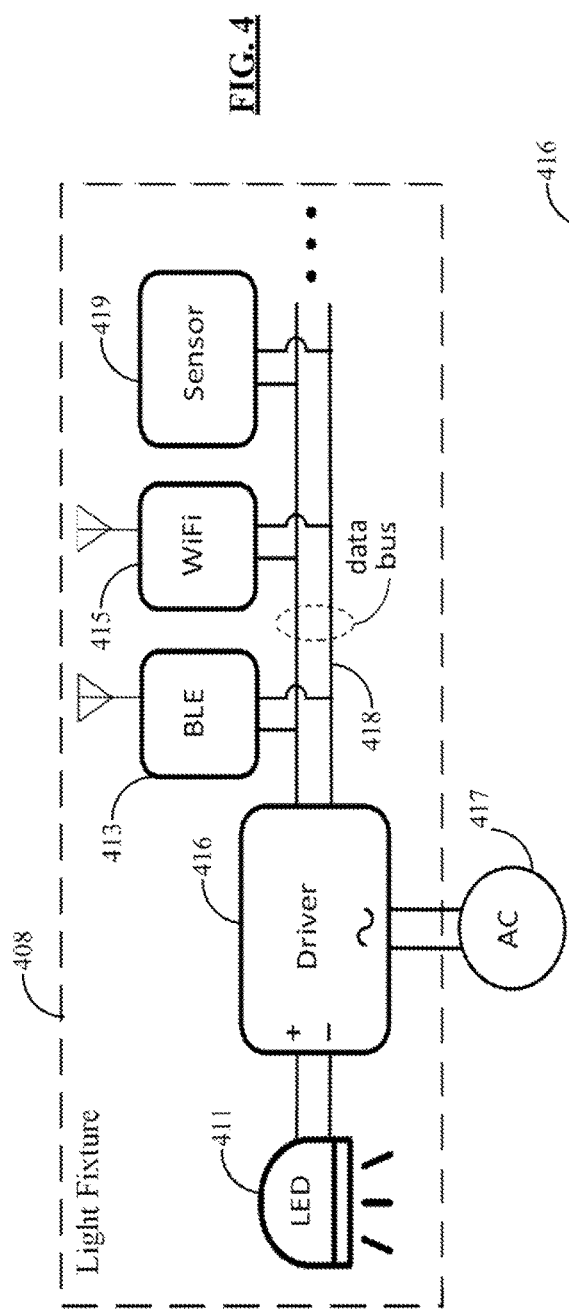
FIG. 4 is a simplified, functional block diagram of an example of a light fixture or other type lighting device, with multiple wireless transceivers and a data bus, for example, for a wireless edge gateway implementation of an ancillary node.

FIG. 4 illustrates a lighting device, such as a light fixture 408 or the like, that includes a light source and two wireless transceivers. In a system, utilizing a wireless flood network, such as that of FIG. 1, a light fixture 408 may be configured as a wireless edge gateway that serves as an ancillary nodal device 106 of FIG. 1. A similar light fixture arrangement 408 might be used in the end nodes 104 of FIG. 1; but if so, one of the wireless transceivers would likely be redundant and unused when the fixture is configured as an end node (but available for later use if that same fixture is later reconfigured as an ancillary nodal device, e.g. upon failure of a fixture 408 previously configured as ancillary nodal device).

With reference to FIG. 4, the emitter or emitters forming the light source may be any suitable type light emitting device(s), such as various forms of incandescent, fluorescent, halide, halogen, arc, or neon lamps. In many examples of a fixture like 408, the emitters are solid state light emitters, just a few examples of which includes electro luminescent (EL) devices, various types of light emitting diodes (LEDs), organic light emitting diodes (OLEDs), planar light emitting diodes (PLEDs) and laser diodes. For purposes of further discussion, the light fixture 408 includes a source formed by one or more lighting emitting diodes indicated collectively by the element labeled LED 411 in the diagram.

Although some light fixtures discussed in a system example later may have a single radio frequency (RF) type wireless transceiver, the example light fixture 408 includes two RF wireless transceivers 413 and 415. In the example, the first wireless transceiver 413 is of a first type, e.g. a Bluetooth Low Energy (BLE) transceiver, configured to communicate over a first radio frequency band. The second wireless transceiver 415 is of a second type, e.g. a WiFi transceiver, different from the first type (BLE); and the second wireless transceiver 415 is configured to communicate over a second radio frequency band. The second radio frequency band (for WiFi in the example) at least partially overlaps the first frequency band (for BLE in the example). For example, BLE or other Bluetooth signals use frequencies between 2.4000 GHz and 2.4836 GHz (the "2.4 GHz band"), while WiFi signals are broadcast using frequencies in three 22-MHz-wide sub-bands spaced out within the 2.4 GHz band. BLE and WiFi are used here by way of non-limiting examples only. Other examples of suitable transceivers include 3G, 4G or 5G cellular transceivers, Zigbee transceivers, sub-gigahertz (e.g. 900 MHz) personal area network (PAN) transceivers, or the like. Also, the example shows two RF wireless transceivers, although the present concepts are similarly applicable in lighting devices that include one or more additional RF wireless transceivers of the same or additionally different types. The substantially simultaneous synchronization techniques, however, apply to various combinations of two or more transceivers of different types where the operational frequency bands at least somewhat overlap.

The light fixture 408 also includes a driver 416 configured to supply power to and control operation of the light source, in this example, the LEDs 411. As discussed more later, the example driver 416 draws power from an external source, such as alternating current (AC) mains 417 and provides direct current (DC) to power the LEDs 411. The example driver 416 is an intelligent type device in that it is programmable and interfaces with additional components in the light fixture 408. One aspect of such a driver 416 is that the driver 416 provides a data bus 418 coupled to support an exchange of data with and for other components of the fixture 408. In the light fixture 408, the data bus 418 supports exchange of data to and from the wireless transceivers 413 and 415. The data exchange over the data bus 418 may be between the wireless transceivers 413 and 415 or between the driver 416 and either one of the wireless transceivers 413 and 415.

Depending on the driver and bus design, the fixture components coupled on the data bus 418 use a suitable protocol to exchange data, commands, etc. For example, the driver 416 may poll the other components on the data bus 418, and the other components will respond by sending any data ready for communication over the bus 418 back over the bus to the driver 416. If intended for the driver 416, the driver 416 itself processes the data (consumes the data). If the data received by the driver 416 over the data bus 418 is intended for another component, the driver 416 sends the data over the data bus 418 in a manner logically addressed to the other fixture component.

Optionally, the light fixture 408 may include one or more sensors. By way of example, the drawing shows a single sensor 419. Examples of sensors relating to lighting control include various types of occupancy and ambient light sensors, a temperature sensor or light sensor coupled to the LEDs 411 to provide feedback, or the like. The sensor 419, however, may be a sensor of a type not necessarily used to control the lighting provided by the LEDs 411, such as an ambient temperature sensor, a vibration sensor, an air pressure and/or humidity sensor, a microphone or other audio input device, a still image or video image sensor, etc. The driver 416 may control the light fixture operation, particularly the LEDs 411, in response to data received from the sensor 419 over the data bus 418; and/or the driver 416 may cause communication of sensor data to other equipment via the data bus 418 and either one or both of the wireless transceivers 413, 415. For example, occupancy sensing data from a sensor 419 may be sent to other lighting devices within range using the BLE wireless transceiver 413.

The components shown in FIG. 4 may be integrated into a single box (e.g., in a luminaire) or distributed spatially to any extent that is compatible with successful bus signaling. For example, the light source 411 and possibly the driver 416 may be in the luminaire component and some or all of the other electronics 413, 415, 419 may be located separately and connected to the source 411 and possibly the driver 416 within the luminaire via the data bus 418.

In one example, in a light fixture 408, the driver 416 communicates with a BLE wireless transceiver 413, a WiFi wireless transceiver 415, and optionally a sensor 419 via a data bus 418. Power is derived by the driver from an AC source 417 and supplied to the wireless transceivers 413, 415 and the sensor 419, via a DC bias on the data bus 418 or via a separate power and ground. The driver 416 also controls an LED light source 411. The data bus 418 conveys data to and from the wireless transceivers 413, 415, and from the sensor 419 to the driver 416. The data bus 418 also conveys commands and data from the driver to the other devices 413, 415, 419. In one implementation of substantially simultaneous command execution, the logic of the driver 416 (e.g. the processor and instructions that configure the processor) enables the driver 416 to communicate over the data bus 418 to control the respective LED light source 411.

Figure 5:
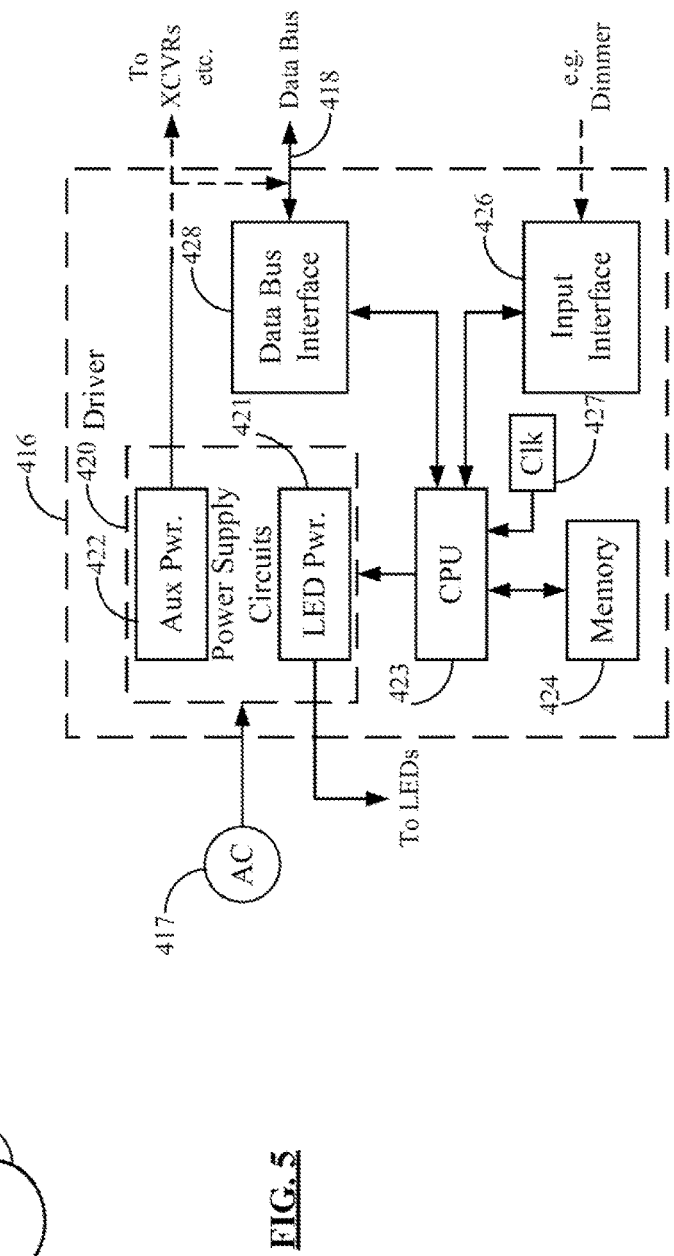
FIG. 5 is a simplified, functional block diagram of an example of a driver, providing a data bus, as may be used in the example light fixture of FIG. 4.

A variety of smart drivers for light sources or other devices may be used to implement the driver 416. It may be helpful to consider a simple/high-level example with respect to the block diagram of FIG. 5. In the example of FIGS. 4 and 5, the source includes a number of LEDs 411 on a single drive channel. Although drivers with additional channels (e.g. for independently controllable sets of LEDS) may be used, for this example, any single-channel LED driver 416 that provides sufficient controllable power to drive the selected LEDs 411 may be used. The driver 416 includes one or more power supplies 420 that obtain power from AC mains 417. One such power supply circuit 421 provides DC power (which may be modulated) to drive the LEDs 411 to emit light for illumination purposes. In the example, the power supply circuits 420 include an additional or auxiliary (Aux) power supply 422. The auxiliary power supply circuit 422 provides power of an appropriate voltage and maximum current to provide power for other electronic components of the light fixture 408, such as the wireless transceivers 413, 415 and the sensor 419 in the example of FIG. 1. The auxiliary power may be provided over the data bus or over a separate power bus (shown as a dotted line arrow).

Examples of suitable drivers 416 are available from eldoLED B.V. The driver 416 may receive power from AC mains, 100V AC to 488V AC, e.g. 120V AC or 220V AC. The driver 416, for example, may be a multi-volt input device capable of driving the LEDs using power obtained from any AC source 417 in a range of 120V AC to 227V. It is also possible to implement the light fixture 408 with a low voltage DC power supply, such as a 24V supply. As another alternative, the light fixture 408 may use a battery power source, as an alternative or a backup to AC mains power. The circuitry of the light fixture 408 may be located remotely from a luminaire that contains the actual LEDs 411, so that only the LEDs are included in the luminaire, and a remotely located driver 416 would connect to the LEDs 411 to supply controlled current to drive the LEDs 411.

The driver 416 in the example also includes processor circuitry in the form of a central processing unit (CPU) 423 along with various memories one of which is shown at 424 for storing instructions for execution by the CPU 423 as well as data having been processed by or to be processed by the CPU 423. The memory 424 for example, may include volatile and non-volatile storage; and the program instructions stored in the memory 424 may include a lighting application (which can be firmware), in this example, for implementing the processor functions of the light fixture including light control functions as wells as communication related functions. The driver 416 also may include an input interface 425 for suitable connection/communication of the driver 416 with other system elements, such as a light switch, dimmer or the like as a user input to control lighting operations. The driver 416 may also implement a clock (Clk) 427 for timing related functions. The clock 434 may be a specific circuit within the driver 416 or implemented as a program controlled function of the CPU processor 423.

The driver 416 also includes a data bus interface 28 coupled to the CPU 423. The data bus interface 28 is a circuit configured for connection to the wires or for coupling to another type media forming the data bus 418 and for providing appropriate signals over the media of the data bus 418 carrying data for the driver and for other fixture components on the data bus 418. In an eldoLED driver, the bus 418 is a two-wire bus and carries data in a proprietary code protocol. The data bus interface 28 in the driver 416 applies signals to such a bus in the protocol and senses signals on the bus in that protocol that have been applied by other fixture components on the particular media implementation of the data bus 418.

The two-wire bus and associated interface are described here by way of non-limiting examples only. It should be apparent that data busses using more than two wires, non-electrical (e.g., optical) busses, and wireless busses may be used in a light fixture 408; and for such alternate bus implementations, the driver 416 would have a corresponding alternate implementation of the data bus interface 28.

The driver 416 may be implemented as a suitable chip set or may be implemented as a single microchip device. In a single chip example, the power supplies 420, the CPU 423, the memory 424, the input interface 426, any circuitry of the clock 427, and the data bus interface 28 are all included on a single chip and sometimes referred to as a "system on a chip" or SoC implementation of a driver.

Figure 6:
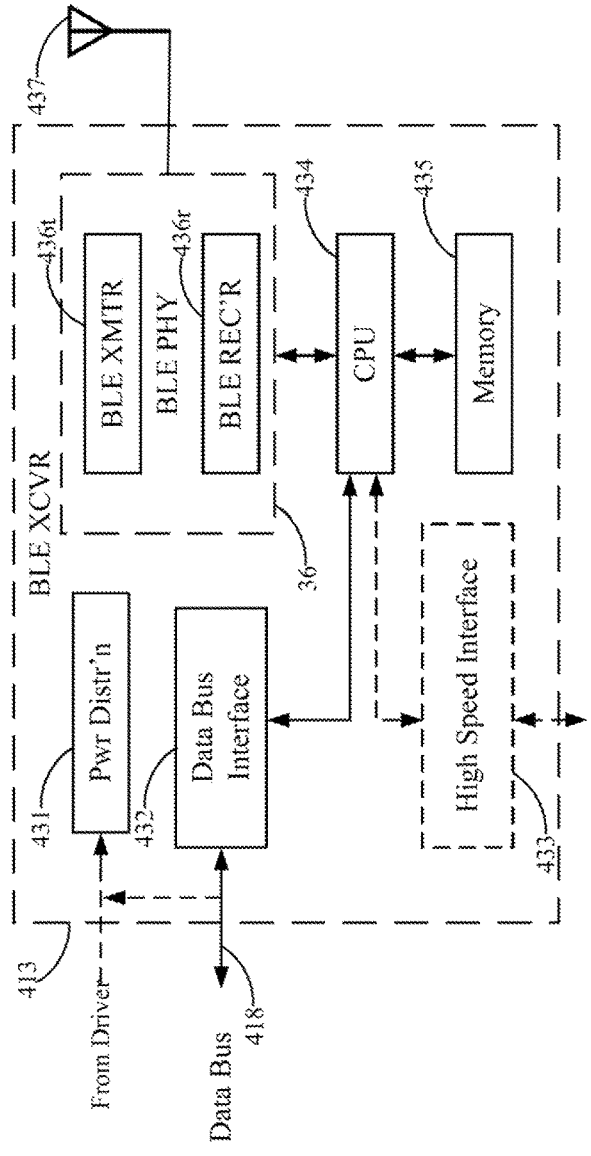
FIG. 6 and FIG. 7 are simplified, functional block diagrams of two examples of transceivers that may be used in the example light fixture of FIG. 4.
Figure 7:
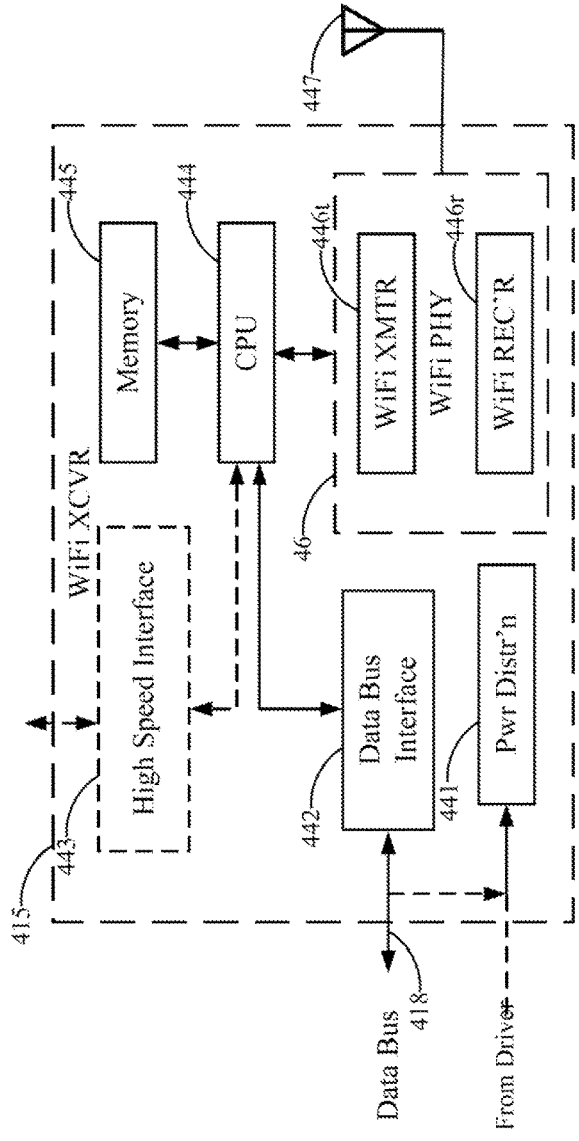

Although additional transceivers may be included, the example light fixture 408 includes two transceivers of different types communicating over radio frequency bands that may be the same but at least somewhat overlap. Typical examples of radio-frequency wireless transceivers suitable for lighting device or lighting system applications include WiFi transceivers; BLE or other Bluetooth transceivers; third-generation (3G), fourth-generation (4G), fifth-generation (5G) or higher cellular transceivers, Zigbee transceivers, sub-gigahertz (e.g. 900 MHz) personal area network (PAN) transceivers, or the like. For purposes of discussion of a specific example, the fixture 408 of FIG. 1 includes a BLE type wireless transceiver 413 and a WiFi type wireless transceiver 415. Such example transceivers may be built in a variety of different configurations. It may be helpful to consider simple/high-level examples of two different types of transceivers with respect to the block diagrams of FIGS. 6 and 7. BLE and WiFi are used here by way of non-limiting examples only. FIG. 6 illustrates an example of the BLE type wireless transceiver (XCVR) 413, and FIG. 7 illustrates an example of the WiFi type wireless transceiver (XCVR) 415.

The BLE wireless transceiver 413 of FIG. 6 includes power distribution circuitry 431, which draws power from the driver 416 (FIGS. 4 and 5), via the data bus 418 (or optionally via a separate power bus shown as a dotted line arrow). The power distribution circuitry 431 converts the received power to one or more voltages and/or current levels suitable to power the various electronic circuits of the BLE wireless transceiver 413. The WiFi wireless transceiver 415 of FIG. 7 includes power distribution circuitry 41 that similarly draws power from the driver 416 and converts the received power to one or more voltages and/or current levels suitable to power the various electronic circuits of the WiFi transceiver 415. In the examples of FIGS. 2 to 4, the driver 416 provides power, which typically involves a wired connection. Where the data bus 418 is wireless (e.g. RF or optical), there may be no such connection, in which case one or both transceivers may draw power from another source (not shown).

The BLE wireless transceiver 413 includes a data bus interface 432, and the WiFi wireless transceiver 415 includes a data bus interface 42. The data bus interfaces 432, 442 of the transceivers are generally similar to the data bus interface 428 of the driver 416 (FIG. 5), in that each of the interfaces 432, 442 is a circuit configured for connection to the wires or coupling to other type media, forming the data bus 418. The data bus interface circuits 432, 442, like the data bus interface 428, also are configured for providing appropriate signals over the media of the data bus 418 carrying data from the respective wireless transceiver 413 or 415 and for sensing data signals on the data bus 418 to recover data for use by the respective wireless transceiver 413 or 415.

Optionally, the BLE wireless transceiver 413 may include a high speed data interface 433, and the WiFi wireless transceiver 415 may include a high speed data interface 443. If included, such additional interfaces 433, 443 would be configured to provide high speed data exchange over a suitable higher speed data bus media (not shown), for example, between the respective wireless transceivers 413, 415, e.g. for any application involving exchange of data in which the transceivers support two types of radio communications at data rates higher than available over the data bus 418 provided by the driver 416.

The illustrated example transceivers 413, 415 are smart devices in that they include processor and memory capabilities for programmed operational control and data processing. Hence, the BLE transceiver 413 includes a central processing unit (CPU) 434 and one or more memories shown collective at 435 storing program instructions (which can be firmware) and configuration data, for implementing communications and any other operations to be implemented by the logic of the transceiver 413. Similarly, the WiFi transceiver 415 includes a central processing unit (CPU) 444 and one or more memories shown collective at 445 storing program instructions (which can be firmware) and configuration data, for implementing communications and any other operations to be implemented by the logic of the transceiver 415. The circuitry of the CPUs may be thought of as individual processors configured upon execution of program instructions from the respective memories.

Each wireless transceiver 413 or 415 also includes physical (PHY) layer circuitry including components for transmitting and receiving RF wireless signals carrying data and associated circuitry interfacing to the respective CPU for exchange of the data and for receiving operational control instructions from the respective CPU. Although other circuitry such as digital signal processors, analog-to-digital and digital-to-analog converters, filters and amplifiers may be included; for simplified illustration purposes, the BLE PHY circuitry 436 and the WiFi PHY circuitry 446 are shown as including respective transmitters and receivers. Hence, the BLE PHY circuitry 436 includes a BLE transmitter 436t and a BLE receiver 436r; and the WiFi PHY circuitry 446 includes a WiFi transmitter 446t and a WiFi receiver 446r.

Each PHY circuitry connects to one or more antennas in or coupled to the respective transceiver. Hence, the BLE PHY circuitry 36 connects to one or more antennas (collectively shown as one antenna 437) specifically configured for two-way wireless communication in the BLE frequency band. Similarly, WiFi PHY circuitry 446 connects to one or more antennas (collectively shown as one antenna 447) specifically configured for two-way wireless communication in the WiFi frequency band. Where the overlap of the relevant frequency bands is particularly substantial, it may be feasible to use a single antenna or possibly a single transmit antenna and a single receive antenna for use by both transceivers 413 and 415.

Each of the transceivers 413, 415 shown by way of examples in FIGS. 6 and 7, may be implemented as a system on a chip (SoC), although they could be implemented as more separate individual components, with each illustrated component formed of one, two or more interconnected chips. Alternatively, the two transceivers might be implemented on a single combined system on a chip, for example, incorporating the different PHY circuits for BLE and WiFi but including only one set of the other components (e.g. the CPU, memory, bus interface).

Each transceiver 413 or 415, in the example, includes programming in a memory 435 or 445. At least a portion of the programming configures the CPU (processor) 434 or 444 to control communications over a respective wireless communication frequency band using the applicable protocol. In this way, the two PHY layer circuits 436, 446, as controlled by the associated processors (CPUs) 434, 444, are configured to communicate over two frequency bands defined by the respective protocol standards, in this case by the BLE standard and the WiFi standard respectively.

Figure 8:
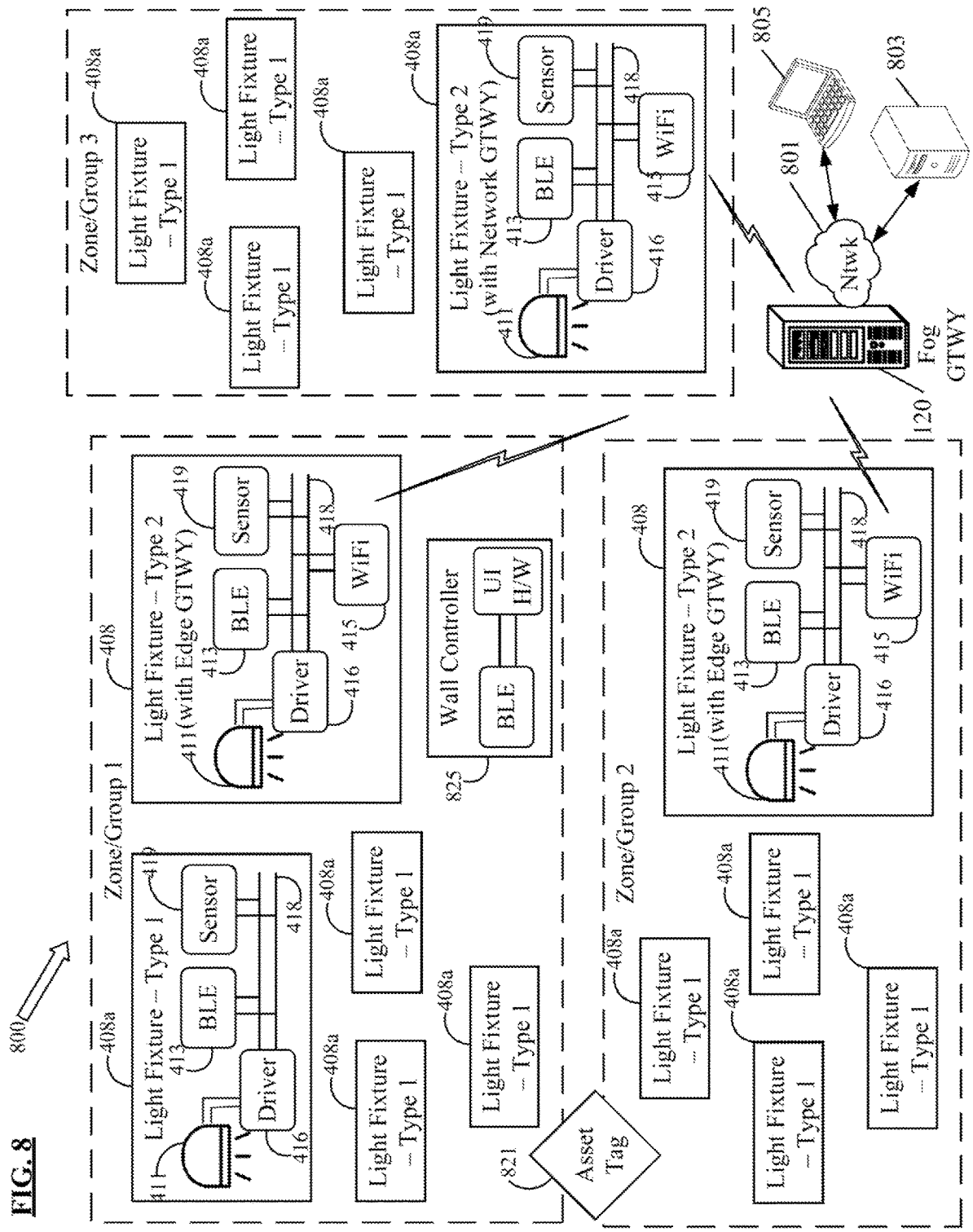
FIG. 8 is a simplified, functional block diagram of an example of a system of lighting fixtures and other equipment, where at least several of the light fixtures may be similar to the example in FIG. 4 and implement the command execution synchronization utilizing substantially simultaneous command execution techniques as shown in the examples of FIGS. 1A-1C and 2.

FIG. 8 illustrates a system 800 of wireless enabled light fixtures 408, 408a distributed about a space, for example, in or around a building at premises. Each of the wireless enabled light fixtures 408 or 408a includes a light source such a LED source 411, a light source driver 416 having a power supply to drive the light source 411 and a data bus interface. Each wireless enabled light fixture 408 or 408a further includes a data bus 418 provided by the interface of the driver 416, and a first wireless transceiver coupled to that data bus 418. Although other types of wireless transceivers could be used as the first type of transceiver that is included in all of the fixtures 408, 408a; in the example system 800, the first transceiver is a BLE type transceiver 413 configured to communicate over a first radio frequency band, e.g. over the band specified in the BLE standard. Some or all of the light fixtures 408, 408a may include sensors 419.

In the drawing, the fixtures 408a are indicated as type 1 light fixtures in that they may only have one wireless transceiver, e.g. only the BLE transceiver 413. Alternatively, they may include additional transceivers, but those transceivers may be inactive (e.g. awaiting activation to reconfigure a type 1 fixture 408a as a type 2 fixture 408).

In the system example 800, each of two or more respective wireless enabled light fixtures, referred to as type 2 light fixtures 408, further includes a second wireless transceiver coupled to the data bus 418 provided by the interface of the driver 416 of the respective light fixture 408. The second wireless transceiver is of a second type different from the first type. Although other types of wireless transceivers could be used as the second type of transceiver in light fixtures 408; in the example system 800, the second wireless transceiver is a WiFi transceiver 415. Each second (e.g. WiFi) wireless transceiver 415 is configured to communicate over a second radio frequency band (e.g. the band allocated for WiFi) that at least partially overlaps the first frequency band.

In each of the respective wireless enabled light fixtures 408, the wireless transceivers are configured to implement radio communications over the respective first and second frequency bands, in response to at least some data received by either one or both of the wireless transceivers 413, 415 over the data bus 418 provided by the interface in the driver 416 of the respective light fixture 408, as described in any of the earlier examples.

In a wireless example of a flood network like that of FIG. 1, the end node light fixtures (for example in the end nodes 104) may use BLE radio frequency transceivers 413 and the edge gateway light fixtures (for example in the ancillary nodal devices 106) may use BLE radio frequency transceivers 413, to communicate with each other over a first frequency band using a first wireless data communication protocol (e.g. in accordance with the BLE standard). The edge gateway light fixtures in such an example may then use the WiFi radio frequency transceivers 415 to communicate with the fog gateway (e.g. fog gateway 120) in a second frequency band using a second wireless data communication protocol (e.g. in accordance with the WiFi standard). The second protocol (e.g. WiFi) is different from first wireless data communication protocol (e.g. BLE). Assuming BLE and WiFi as the applicable standards in this example, the frequency bands may at least partially overlap. The ancillary nodal devices 106 are wireless edge gateways in that they facilitate transitions between communications using the BLE first wireless data communication protocol on the first frequency band and the WiFi second wireless data communication protocol on the second frequency band.

The light fixtures 408, 408a of the system 800 are arranged to provide general illumination about a premises of operations. In the system 800, however, the light fixtures 408 having two active wireless transceivers 413, 415 may be configured for an additional communications related function. For example, each of the type 2 light fixtures 408 may have programming in a memory accessible to one of the processors of the fixture 408 configuring the respective light fixture 408 as an edge gateway with respect to a number of others of the wireless enabled light fixtures 408a. At a high level, in the BLE/WiFi example, light fixtures 408, 408a in a zone or group (three of which are shown by way of a non-limiting example) may communicate with each other via BLE. The lighting fixtures 408, 408a in a group in turn may be arranged to provide general illumination in a respective zone or area of the premises. The lighting fixtures 408 provide a gateway between the BLE based light fixture communications of the respective groups and a WiFi network that includes all of the type 2 light fixtures 408 and a fog gateway 120.

The system 800 in the example of FIG. 8 therefore also includes the fog gateway 120. An example of that gateway 120, includes a wireless transceiver of the second type wireless transceiver (e.g. another WiFi transceiver) configured for wireless network communications with the respective wireless enabled light fixtures 408 using the second radio frequency band (e.g. the band allocated for WiFi). The fog gateway 120 also includes a data network interface for communication via a data network 801 with other computers 803, 805.

The data network 801 may be a local area network or a wide area network such as an intranet or the public Internet. The drawing shows a host or server type network connected computer 803 and a laptop type user terminal device 805 as non-limiting examples of external equipment that may communicate with the system 800 via the network 801 and the fog gateway 120, for various data gathering or control purposes.

The fog gateway 120 includes a processor (not shown) is coupled to the second type wireless transceiver of the fog gateway 120 and the data network interface. The processor is programmed or otherwise configured to cause the fog gateway 120 to provide a gateway between wireless network communications via the second type (e.g. WiFi) transceivers of the respective wireless enabled light fixtures 408 using the second (e.g. WiFi) radio frequency band and the data network 801.

The edge gateway functionalities in light fixtures 408 may serve to translate messages received via BLE from other light fixtures into communications suitable for exchange with the fog gateway 120, for example, via WiFi. The edge gateway functionalities in light fixtures 408 may serve to translate messages received from the fog gateway 120 over WiFi for communication to other light fixtures 408a over BLE.

The drawing shows an example of an asset tag 821 at a location in the premises served by the system 800. Although not shown, the asset tag 821 includes circuitry, such as a BLE transmitter or an RFID transmitter, with a unique identifier that is detectable by the BLE transceiver and/or a sensor in the light fixtures 408, 408a. The system 800 may include other wireless enabled devices, such as the wall controller device 825. The example wall controller 825 includes a BLE transceiver, similar to the transceivers 413. The example wall controller 825 also includes user interface (UI) hardware (H/W), such as one or more switches, a dimmer setting input device, a keypad, audio or visual feedback elements, a touch pad or touchscreen, or the like. The edge gateway functionalities in light fixtures 408 may serve to also translate messages received from or generated in response to communications from other devices at the premises via BLE, such as the asset tag 821 and the wall controller 825, into communications suitable for exchange with the fog controller 120 via Wifl. The edge gateway functionalities in light fixtures 408 may serve to also translate messages from the fog gateway 120 for communication to such other devices, such as the wall controller 825.

The communications through the edge gateway functionalities of the light fixtures 408 may relate to lighting operations. Lighting related communications, for example, may include lighting related sensor data or light fixture status/health data to be sent upstream to the fog gateway 120. Non-lighting sensor data may be similarly sent upstream to the fog gateway 120. In the downstream direction from the fog gateway 120, lighting related communications, for example, may include lighting commands (e.g. turn ON LEDs 411, turn OFF LEDs 411, dimming or the like); configuration setting data (e.g. to define members of a control group, to designate a light fixture to act as a zone controller or as an edge gateway in a group, or the like); or software or firmware updates for the light fixtures 408, 408a and possibly for a wall controller 825.

For more information about asset tracking via a system like system 800, attention may be directed to U.S. patent application Ser. No. 15/916,861, filed Mar. 9, 2018, entitled, "Asset Tag Tracking System and Network Architecture," the entire disclosure of which is incorporated herein by reference. Although somewhat different types of transceivers are used for the wireless communications among light fixtures, more information regarding a protocol and procedures for wireless communications amongst light fixtures, wall switches, at least one gateway, etc. may be found in U.S. Pat. No. 9,883,570 issued Jan. 30, 2018, entitled "Protocol for Lighting Control via a Wireless Network," the entire disclosure of which is incorporated herein by reference.

The fog gateway 120 is configured for wireless data communication with the type 2 light fixtures 408 configured as edge gateways. For example, the fog gateway 120 may be configured with a WiFi radio frequency transceiver that is compatible with the WiFi radio frequency transceiver 415 of each of the light fixtures 408. Although the gateway 120 may use special purpose hardware, the example utilizes an appropriately programmed computer platform.

Figure 9:
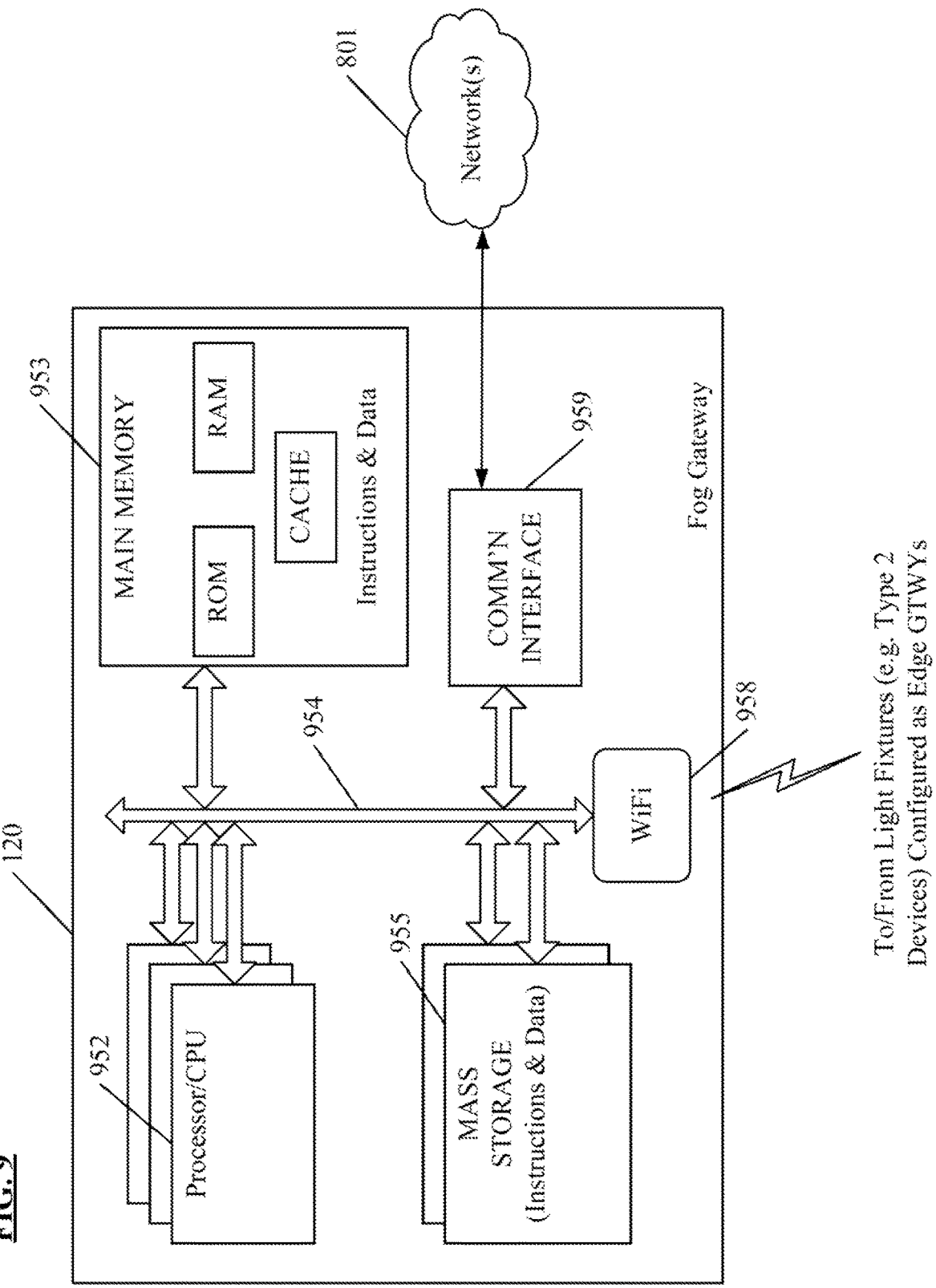
FIG. 9 is a simplified, functional block diagram of an example of a hardware platform for a fog gateway, as may be used in the example system of FIG. 8.

FIG. 9 is a functional block diagram of a general-purpose computer system 120, by way of just one example of a hardware platform that may perform the functions of the fog gateway. The example 120 will generally be described as an implementation of a server or host type computer, e.g. as might be configured as a blade device in a server farm or in network room of a particular premises. Alternatively, the computer system may comprise a mainframe or other type of host computer system capable of web-based communications, media content distribution, or the like via the network 801 and the on-premises WiFi network formed with type 2 light fixtures 408.

The computer system 120 in the example includes a central processing unit (CPU) 952 formed of one or more processors, a main memory 953, mass storage 955 and an interconnect bus 954. The circuitry forming the CPU 952 may contain a single microprocessor, or may contain a number of microprocessors for configuring the computer system 120 as a multi-processor system, or may use a higher speed processing architecture. The main memory 953 in the example includes ROM, RAM and cache memory; although other memory devices may be added or substituted. Although semiconductor memory may be used in the mass storage devices 955, magnetic type devices (tape or disk) and optical disk devices may be used to provide higher volume storage. In operation, the main memory 953 stores at least portions of instructions and data for execution by the CPU 952, although instructions and data are moved between memory 953 and storage 955 and the CPU 952 via the interconnect bus 954.

The computer system of the fog gateway 120 also includes one or more input/output interfaces for communications, shown by way of example as interface 959 for data communications via the network 801 as well as a WiFi type wireless transceiver 958. Each interface 959 may be a high-speed modem, an Ethernet (optical, cable or wireless) card or any other appropriate data communications device. The physical communication link(s) to/from the interface 959 may be optical, wired, or wireless (e.g., via satellite or cellular network). Although other transceiver arrangements may be used, the example fog gateway 120 utilizes a WiFi type wireless transceiver 958 similar to the WiFi type wireless transceivers 415 in the light fixture and component examples of FIGS. 1 and 4 described above. The WiFi type wireless transceiver 958 enables the fog gateway 120 to communicate over-the-air with the WiFi type wireless transceivers 415 in the edge gateways implemented in light fixtures 408 in the system 800 of FIG. 8.

Although not shown, the computer platform configured as the fog gateway 120 may further include appropriate input/output ports for interconnection with a local display and a keyboard and mouse or with a touchscreen or the like, serving as a local user interface for configuration, programming or trouble-shooting purposes. Alternatively, the operations personnel may interact with the computer system of the fog gateway 120 for control and programming of the system from remote terminal devices via the Internet or some other link via any network 801.

The computer system implementing the fog gateway 120 runs a variety of applications programs and stores various information in a database or the like for control of the fixtures, wall controllers and any other elements of the lighting system 800 and possibly elements of an overall building managements system (BMS) at the premises. One or more such applications, for example, might enable asset tracking, lighting control through the fog gateway and/or lighting control based on input from the sensors 419 or the wall controller 825.

The example FIGS. 8 and 9 show a single instance of a fog gateway 120. Of course, the fog gateway functions may be implemented in a distributed fashion on a number of similar platforms, to distribute the processing load. Additional networked systems (not shown) may be provided to distribute the processing and associated communications, e.g. for load balancing or failover.

The hardware elements, operating systems and programming languages of computer systems like that of the fog gateway 120 generally are conventional in nature, and it is presumed that those skilled in the art are sufficiently familiar therewith to understand implementation of the present system and associated lighting control technique using suitable configuration and/or programming of such computer system(s).

As outlined above, the substantially simultaneous command execution is implemented by configuration of a driver 416 of a light fixture 408 and/or one or more transceivers 413, 415 communicating with the driver 416 via a data bus 418 provided by the driver 416. In several examples, the driver 416 or one or more transceivers 413, 415 includes a processor, and the configuration for the substantially simultaneous command distribution and/or execution is implemented by appropriate programming for the appropriate processor(s) of the light fixture 408 at the various end nodes of the network. Software or firmware programming for the processor(s) of a light fixture 408, including for the functions related to substantially simultaneous command execution, may be communicated to and installed in memories of any or all such light fixtures 408 via a network, including over-the-air via the wireless communications of the system of FIG. 8. Such software or firmware communications may originate on the fog gateway 120 or a computer like 803 or 805 that accesses the system 800 via the network 801 and the fog gateway 120.

Program or data aspects of the technology discussed above therefore may be thought of as "products" or "articles of manufacture" typically in the form of executable programming code (firmware or software) or data that is carried on or embodied in a type of machine readable medium. This programming and/or control data is configured to implement substantially simultaneous command execution operations in one or more of the ways described above.

"Storage" type media include any or all of the tangible memory of lighting fixtures 408 or drivers 416 or transceivers 413, 415 thereof, as well as various computer platforms, such as that of the fog gateway 120, a host or server computer 803 or user terminal 805 on an external network 801, or any of the various processors or the like, such as various volatile or non-volatile semiconductor memories, tape drives, disk drives and the like, which non-transitory devices may provide storage at any time for executable software or firmware programming and/or any relevant data or information. All or portions of the programming and/or configuration data may at times be communicated through the Internet or various other telecommunication networks. Such communications, for example, may enable loading of the data or programming from one computer or processor into another, for example, from the fog gateway 120, a management server or host computer of a lighting system or BCAS management system type service provider into any of the light fixtures 408. Thus, another type of media that may bear the programming or data elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible or "storage" media, terms such as computer or machine "readable medium" refer to any medium that participates in providing instructions to a processor for execution.

The programming or data for substantially simultaneous command execution may be embodied in at least one machine readable medium, one or more of which may be non-transitory. For example, if downloaded to a light fixture 408, the programming or data could be stored in a hardware device that serves as the memory/storage of the driver or transceiver(s) of the light fixture. The memory/storage is an example of a non-transitory type of media. By way of another example, at times, executable operational programming, including programming and/or data for the substantially simultaneous command execution may reside in the memory/storage of the fog gateway, a server or user terminal device and be streamed over the network media to one or more light fixtures. In these later examples, the signal(s) on the network would be transitory in nature. However, the buffer memory and any memory or registers internal to the processor memory, or any hardware storage device used by the fog gateway, server or other computer to maintain the programming and any data or to prepare selected programming or data for transmission over the network would be additional examples of non-transitory media.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," "includes," "including," or any other variation thereof, are intended to cover a non-exclusive inclusion, such that a process, method, article, or apparatus that comprises or includes a list of elements or steps does not include only those elements or steps but may include other elements or steps not expressly listed or inherent to such process, method, article, or apparatus. An element preceded by "a" or "an" does not, without further constraints, preclude the existence of additional identical elements in the process, method, article, or apparatus that comprises the element.

Unless otherwise stated, any and all measurements, values, ratings, positions, magnitudes, sizes, and other specifications that are set forth in this specification, including in the claims that follow, are approximate, not exact. Such amounts are intended to have a reasonable range that is consistent with the functions to which they relate and with what is customary in the art to which they pertain. For example, unless expressly stated otherwise, a parameter value or the like may vary by as much as ±10% from the stated amount.

In addition, in the foregoing Detailed Description, it can be seen that various features are grouped together in various examples for the purpose of streamlining the disclosure. This method of disclosure is not to be interpreted as reflecting an intention that the claimed examples require more features than are expressly recited in each claim. Rather, as the following claims reflect, the subject matter to be protected lies in less than all features of any single disclosed example. Thus the following claims are hereby incorporated into the Detailed Description, with each claim standing on its own as a separately claimed subject matter.

While the foregoing has described what are considered to be the best mode and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present concepts.

What is claimed is:

1. A method comprising steps of:
   propagating a message, from a gateway to ancillary nodal devices in a wireless nodal network, wherein each of the ancillary nodal devices is within a substantially equal number of transmissive steps of the gateway through the wireless nodal network such that the message is propagated with approximately equivalent delay to said each of the ancillary nodal devices and substantially simultaneously received by all of the ancillary nodal devices;
   substantially simultaneously transmitting the message from the ancillary nodal devices, wherein:
      the transmitting includes transmitting the message from each respective one of the ancillary nodal devices to end nodal devices of a respective group of the end nodal devices in the wireless nodal network coupled to or in communication with said each respective one of the ancillary nodal devices, and
      each of the end nodal devices of said each respective group comprises a respective light source; and
   upon receipt of the message from the ancillary nodal devices, substantially simultaneously executing a command or instruction associated with the message, by said each respective group of the end nodal devices of the wireless nodal network, wherein the executing comprises controlling a perceptible operation of the respective light source.

2. The method of claim 1, wherein the controlling of the perceptible operation of the respective light source comprises one of turning the respective light source of each end nodal device ON, turning the respective light source of said each of the end nodal devices OFF, dimming intensity of the respective light source of said each of the end nodal devices, or changing color of light output from the respective light source of said each of the end nodal devices.

3. The method of claim 1, wherein said each of the end nodal devices is in direct communication with at least one of the ancillary nodal devices.

4. The method of claim 1, wherein propagating the message comprises the transmission of the message from the gateway directly to said each of the ancillary nodal devices.

5. The method of claim 1, wherein said each of the ancillary nodal devices includes:
   a wireless transceiver of a first type configured to communicate over a first radio frequency band in a first mode; and
   a wireless transceiver of a second type different from the first type, configured to communicate over a second radio frequency band in a second mode, the second radio frequency band at least partially overlapping the first frequency band; and
   said each of the end nodal devices is a light fixture further including a wireless transceiver of the second type.

6. The method of claim 5, wherein:
   said each of the ancillary nodal devices is a light fixture including a respective light source; and
   the light fixture of said each of the ancillary nodal devices further comprises:
      a driver configured to supply power to and control operation of the respective light source of the ancillary nodal device light fixture; and
      a data bus provided by the driver and coupled to support an exchange of data to and from the wireless transceivers of said each of the ancillary nodal devices.

7. The method of claim 1, wherein the ancillary nodal devices are in communication with the gateway in a first mode and are in communication with the end nodal devices in a second mode different from the first mode.

8. A system comprising:
   end nodal devices distributed in a wireless nodal network, wherein each of the end nodal devices comprises:
      a light source; and
      a node radio frequency transceiver configured to receive and transmit radio frequency signals in a first frequency band;
   ancillary nodal devices distributed in the wireless nodal network, wherein each of the ancillary nodal device comprises:
      an ancillary node radio frequency transceiver, the ancillary node radio frequency transceiver being configured to communicate with the node radio frequency transceivers of at least some of the end nodal devices; and
      a communication interface; and
   a gateway communicatively coupled to communication interfaces of the ancillary nodal devices, wherein: the gateway is configured to substantially simultaneously transmit a message to the ancillary nodal devices, and each of the ancillary nodal devices is within a substantially equal number of transmissive steps of the gateway through the wireless nodal network such that the message is transmitted with approximately equivalent delay to each of the ancillary nodal devices and is substantially simultaneously received by all of the ancillary nodal devices;
   wherein each of the ancillary nodal devices is configured to substantially simultaneously transmit the message to the end nodal devices of a group of the end nodal devices in the wireless nodal network;
   wherein upon receipt of the message from the ancillary nodal devices, each of the groups of the end nodal devices is configured to substantially simultaneously execute a command or instruction associated with the message; and
   wherein to execute the command or instruction, have each end nodal device of each group control a perceptible operation of a respective light source.

9. The system of claim 8, wherein to control of the perceptible operation of the respective light source comprises one of turning the respective light source of the end nodal device ON, turning the respective light source of the end nodal device OFF, dimming intensity of the respective light source of the end nodal device, or changing color of light output from the respective light source of the end nodal device.

10. The system of claim 8, wherein said each of the end nodal devices is in direct communication with at least one of the ancillary nodal devices.

11. The system of claim 8, wherein the message is transmitted from the gateway directly to said each of the ancillary nodal devices.

12. The system of claim 8, wherein the ancillary nodal devices are in communication with the gateway in a first mode and are in communication with the end nodal devices in a second mode different from the first mode.

13. The system of claim 8, wherein said each of the ancillary nodal devices includes:
   a wireless transceiver of a first type configured to communicate over a first radio frequency band in a first mode; and
   a wireless transceiver of a second type different from the first type, configured to communicate over a second radio frequency band, the second radio frequency band at least partially overlapping the first frequency band; and
   said each end nodal devices is a light fixture including a wireless transceiver of the second type.

14. The system of claim 13, wherein:
   said each ancillary nodal devices is a light fixture including a respective light source; and
   the light fixture of said each ancillary nodal devices further comprises:
      a driver configured to supply power to and control operation of the respective light source of the ancillary nodal device light fixture; and
      a data bus provided by the driver and coupled to support an exchange of data to and from the wireless transceivers of the ancillary nodal device.

15. The system of claim 8, wherein each of the communication interfaces of the ancillary nodal devices comprises an other ancillary radio frequency transceiver configured to receive and transmit radio frequency signals in a second frequency band for communications with the gateway.

16. The system of claim 15, wherein:
   end node radio frequency transceivers are configured to communicate with ancillary radio frequency transceivers in the first frequency band using a first wireless data communication protocol;
   the other ancillary radio frequency transceiver is configured to communicate with the gateway in the second frequency band using a second wireless data communication protocol different from the first wireless data communication protocol.

17. The system of claim 16, wherein the first and second frequency bands at least partially overlap.

18. The system of claim 16, wherein the ancillary nodal devices are wireless edge gateways between communications using the first wireless data communication protocol on the first frequency band and the second wireless data communication protocol on the second frequency band.

19. The method of claim 1, wherein the substantially equal number of transmissive steps includes at least one of a number of repeaters or a number of node hops.

20. The system of claim 8, wherein the substantially equal number of transmissive steps includes at least one of a number of repeaters or a number of node hops.

* * * * *